United States Patent
Yamaguchi et al.

(10) Patent No.: US 11,499,905 B2
(45) Date of Patent: Nov. 15, 2022

(54) CENTRIFUGAL SEDIMENTATION TYPE PARTICLE SIZE DISTRIBUTION MEASURING DEVICE

(71) Applicant: HORIBA, Ltd., Kyoto (JP)

(72) Inventors: Tetsuji Yamaguchi, Kyoto (JP); Takeshi Akamatsu, Kyoto (JP)

(73) Assignee: HORIBA, LTD., Kyoto (JP)

( * ) Notice: Subject to any disclaimer, the term of this patent is extended or adjusted under 35 U.S.C. 154(b) by 0 days.

(21) Appl. No.: 17/287,921

(22) PCT Filed: Oct. 29, 2019

(86) PCT No.: PCT/JP2019/042264
§ 371 (c)(1),
(2) Date: Apr. 22, 2021

(87) PCT Pub. No.: WO2020/090776
PCT Pub. Date: May 7, 2020

(65) Prior Publication Data
US 2021/0381944 A1    Dec. 9, 2021

(30) Foreign Application Priority Data

Oct. 31, 2018  (JP) .............................. JP2018-205631

(51) Int. Cl.
*G01N 21/15*    (2006.01)
*G01N 15/04*    (2006.01)
*G01N 21/03*    (2006.01)
(52) U.S. Cl.
CPC ....... *G01N 15/042* (2013.01); *G01N 21/0332* (2013.01); *G01N 2021/0335* (2013.01); *G01N 2201/06113* (2013.01)

(58) Field of Classification Search
CPC .. G01N 15/0205; G01N 15/042; G01N 15/04; G01N 15/0211; G01N 15/0255;
(Continued)

(56) References Cited

U.S. PATENT DOCUMENTS

| 4,311,039 A | 1/1982 | Koehler et al. |
| 4,671,102 A | 6/1987 | Vinegar et al. |
| 4,920,550 A * | 4/1990 | Olivier ................. G01N 23/083 378/57 |

FOREIGN PATENT DOCUMENTS

| JP | S62-115140 U | 7/1987 |
| JP | S62-195747 U | 12/1987 |

(Continued)

OTHER PUBLICATIONS

PCT, International Search Report for the corresponding application No. PCT/JP2019/042264, dated Jan. 21, 2020, with English translation.
(Continued)

*Primary Examiner* — Hoa Q Pham
(74) *Attorney, Agent, or Firm* — Lucas & Mercanti, LLP

(57) ABSTRACT

An object of the present claimed invention is to improve cell cooling performance, keep a temperature of a dispersion medium constant, and improve measurement accuracy. The particle size distribution measuring device of this invention comprises a cell holding body 31 that holds a cell 2 housing a measurement sample and that is rotated by a motor 322, a case (C) having a housing space (S) for rotatably housing the cell holding body 31, and a cooling mechanism 8 for cooling the cell 2. The cooling mechanism 8 comprises a cooler 81, and a supply channel 82 that supplies a gas that has been cooled by the cooler 81 to the housing space (S).

8 Claims, 15 Drawing Sheets

(58) Field of Classification Search
CPC .. G01N 2015/045; G01N 21/07; G01N 21/01; G01N 21/03; G01N 21/49; G01N 21/0332; G01N 2021/0335; G01N 2201/06113
USPC .......................................... 356/335–343, 73
See application file for complete search history.

(56) References Cited

FOREIGN PATENT DOCUMENTS

| | | |
|---|---|---|
| JP | S63-279143 A | 11/1988 |
| JP | 2005-345086 A | 12/2005 |
| JP | 2008307219 A * | 12/2008 |

OTHER PUBLICATIONS

Yoshiaki Togawa, "The CAPA-700 Particle-Size Distribution Analyzer Using Photo-Sedimentation with Gravitational and Centrifugal Acceleration," Readout, HORIBA Technical Reports, Jan. 1992, pp. 23-29, No. 4, with English Abstract.

EPO, Extended European Search Report for the corresponding application No. 19878449.8, dated Jun. 13, 2022.

* cited by examiner

CENTRIFUGAL SEDIMENTATION TYPE PARTICLE SIZE DISTRIBUTION MEASURING DEVICE

CROSS REFERENCE TO RELATED APPLICATION

This Application is a 371 of PCT/JP2019/042264 filed on Oct. 29, 2019, which, in turn, claimed the priority of Japanese Patent Application No. 2018-205631 filed on Oct. 31, 2018, both applications are incorporated herein by reference.

FIELD OF THE ART

This invention relates to a centrifugal sedimentation type particle size distribution measuring device.

BACKGROUND ART

A conventional centrifugal sedimentation type particle size distribution measuring device rotates a cell that houses a measurement sample and a dispersion medium and settles the particles of the measurement sample in the dispersion medium so that a particle size of the measurement sample is measured.

In this particle size distribution measuring device, frictional heat is generated due to air resistance for rotating a cell holding body that holds the cell. This frictional heat changes the temperature of the dispersion medium in the cell so that the viscosity, density, or refractive index of the dispersion medium changes. In particular, if the viscosity or the density changes, the settling speed of the particles is significantly influenced. As a result of this, the accuracy of the particle size distribution measurement is degraded.

For this reason, as shown in a non-patent document 1, it is considered that the cell or the cell holding body is cooled by air blast by a blower fan arranged at a top or a bottom of the cell holding body.

However, cooling performance of the cell or the cell holding body is not sufficient just by blowing air into the cell or the cell holding body, and it is difficult to keep the temperature of the dispersion medium housed in the cell constant.

PRIOR ART DOCUMENTS

Non-Patent Documents

Non-patent document 1: Yoshiaki TOGAWA., "The CAPA-700 Particle-Size Distribution Analyzer Using Photo-Sedimentation with Gravitational and Centrifugal Acceleration" Readout, Horiba Co. January 1992, No. 4, p. 23-29

DISCLOSURE OF THE INVENTION

Problems to be Solved by the Invention

The present claimed invention is to solve the above-mentioned problems, and a main object of this invention is to improve the cooling performance of the cell and to keep the temperature of the dispersion medium constant so that the measurement accuracy is improved.

Means to Solve the Problems

More specifically, the centrifugal sedimentation type particle size distribution measuring device in accordance with this invention comprises a cell holding body that holds a cell in which a measurement sample and a dispersion medium are housed and that is rotated by a rotating mechanism, a case that has a housing space in which the cell holding body is housed in a rotatable manner, and a cooling heat exchanger for cooling the cell.

In accordance with this arrangement, since the cell is cooled by the cooling heat exchanger, viscosity, density or a refractive index of the dispersion medium can be kept constant so that it is possible to measure a sedimentation velocity of the particles accurately. As a result of this, the particle size distribution can be measured accurately.

It is preferable to comprise a supply channel that supplies a gas cooled by the cooling heat exchanger to the housing space. In accordance with this arrangement, since the cooling heat exchanger can be arranged outside of the housing space, it is possible to simplify an internal structure of the housing space and to reduce a local frictional heat.

In order to enable the centrifugal sedimentation type particle size distribution measuring device by the line start method, it is conceivable to provide a sample introducing mechanism that introduces a measurement sample in a cell that is rotated by a rotating mechanism. The sample introducing mechanism is arranged on a rotation center of the cell holding body on an upper wall that forms the housing space. In accordance with this arrangement, a space part for introducing the measurement sample into the cell rotated by the rotating mechanism is formed on an upper wall that forms the housing space. As the space part, not only the sample introducing channel of the sample introducing mechanism but also a gap formed to arrange the sample introducing mechanism is included.

In addition, when the cell holding body is rotated in the housing space, the rotation center part becomes a negative pressure. In order to make it easy to introduce the cooled gas into the housing space by taking advantage of this characteristics, it is preferable that one end of the supply channel is connected to the space part and the cooled gas is supplied to the housing space through the space part. In accordance with this arrangement, since the cooled gas flows along the cell holding body to the outside in the radial direction, it is possible to cool whole of the cell holding body and to keep the temperature in the cell holding body constant.

In order to make it easy to keep the temperature of the housing space constant, it is preferable that the other end of the supply channel is connected to an outside of the housing space in a radial direction, and the gas in the housing space circulates through the supply channel.

In order to make it easy to control the temperature in the cell to be constant, it is preferable to further comprise a temperature sensor that detects a temperature of the housing space and a control part that controls the cooling mechanism based on the temperature detected by the temperature sensor. In addition, in accordance with this arrangement, it is also possible to control the temperature in the cell at a desired temperature.

The centrifugal sedimentation particle size distribution measuring device further comprises a light irradiating part that irradiates light to the cell, a light detecting part that detects the light transmitting the cell, and a particle size distribution calculating part that obtains a light intensity signal from the light detecting part and calculates the particle size distribution.

In order to make it possible for the centrifugal sedimentation particle size distribution measuring device having this arrangement to measure the particle side distribution accurately by making use of this arrangement wherein the temperature sensor is arranged, it is preferable that the particle size distribution calculating part corrects the particle size distribution based on the temperature detected by the temperature sensor.

In the arrangement wherein the light irradiating part and the light detecting part are arranged inside of the housing space, frictional heat increases locally between the rotating cell holding body and the light irradiating part and/or the light detecting part so that it becomes difficult to adjust the temperature due to temperature irregularity.

In order to preferably solve this problem, it is preferable that the light irradiating part and the light detecting part are arranged outside of the housing space.

In accordance with this arrangement, temperature irregularity due to the light irradiating part and the light detecting part can be reduced without generating frictional heat locally so that it is possible to keep the temperature in the holding space still more constant by combining with the effect of the cooling mechanism.

It is preferable that a rotation axis of the cell holding body extends in the vertical direction, and the upper and lower surfaces, facing the cell holding body, of the surfaces forming the housing space are flat.

In accordance with this arrangement, since the upper and lower surfaces facing the cell holding body are flat, in other words, without any unevenness, it is possible to further reduce the temperature irregularity without locally generating frictional heat.

Effect of the Invention

In accordance with the above-mentioned present claimed invention, it is possible to improve the cooling performance of the cell and to keep the temperature of the dispersion medium constant so that the measurement accuracy is improved.

EXPLANATION OF CODES

Figure 1:
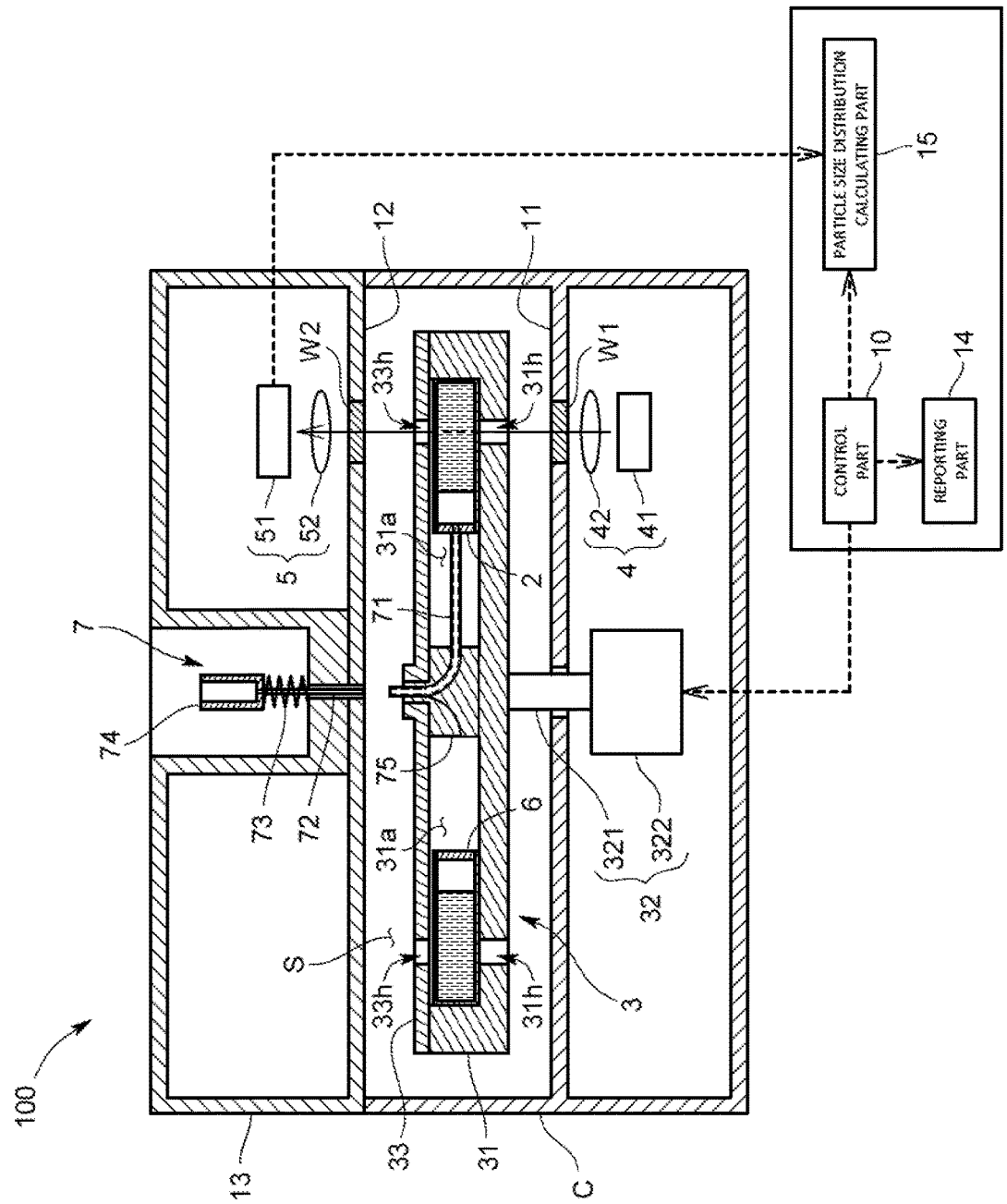
FIG. 1 A view schematically showing a centrifugal sedimentation type particle size distribution measuring device of one embodiment in accordance with this invention.

100 . . . centrifugal sedimentation type particle size distribution measuring device
C . . . case
2 . . . measurement cell
3 . . . cell rotating mechanism
31 . . . cell holding body
4 . . . light irradiating part
5 . . . light detecting part
8 . . . cooling mechanism
81 . . . cooler
82 . . . supply channel
TS . . . temperature sensor
10 . . . control part
15 . . . particle size distribution calculating part

BEST MODES OF EMBODYING THE INVENTION

A centrifugal sedimentation type particle size distribution measuring device according to one embodiment of the present claimed invention will be described below with reference to drawings.

The centrifugal sedimentation type particle size distribution measuring device 100 of this embodiment measures a particle size distribution by means of a line start method, as shown in FIG. 1, and comprises a measurement cell 2 that houses a measurement sample and a dispersion medium, a cell rotating mechanism 3 that rotates the measurement cell 2, and the light irradiating part 4 and the light detecting part 5 arranged across a rotation passage area of the measurement cell 2 rotated by the cell rotating mechanism 3. The measurement sample in this embodiment is a sample suspension in which particles are dispersed and the dispersion medium is a density gradient solution.

The measurement cell 2 is a rectangular cell made of a translucent material such as a resin. The density gradient solution, as being a solution in which a density gradient is formed, is housed in this measurement cell 2. This density gradient solution is formed by using multiple sucrose solutions each of which has a different concentration and is housed in a multilayered form so that the density gradually increases toward a bottom side of the measurement cell 2. In this embodiment, a reference cell 6 is also arranged, and water is housed in the reference cell 6.

The cell rotating mechanism 3 rotates the measurement cell 2 so as to apply a centrifugal force from the smaller to the larger density gradient.

Concretely, the cell rotating mechanism 3 comprises a cell holding body 31 on which the measurement cell 2 and the reference cell 6 are detachably mounted, and a rotating part 32 that rotates the cell holding body 31.

Figure 2:
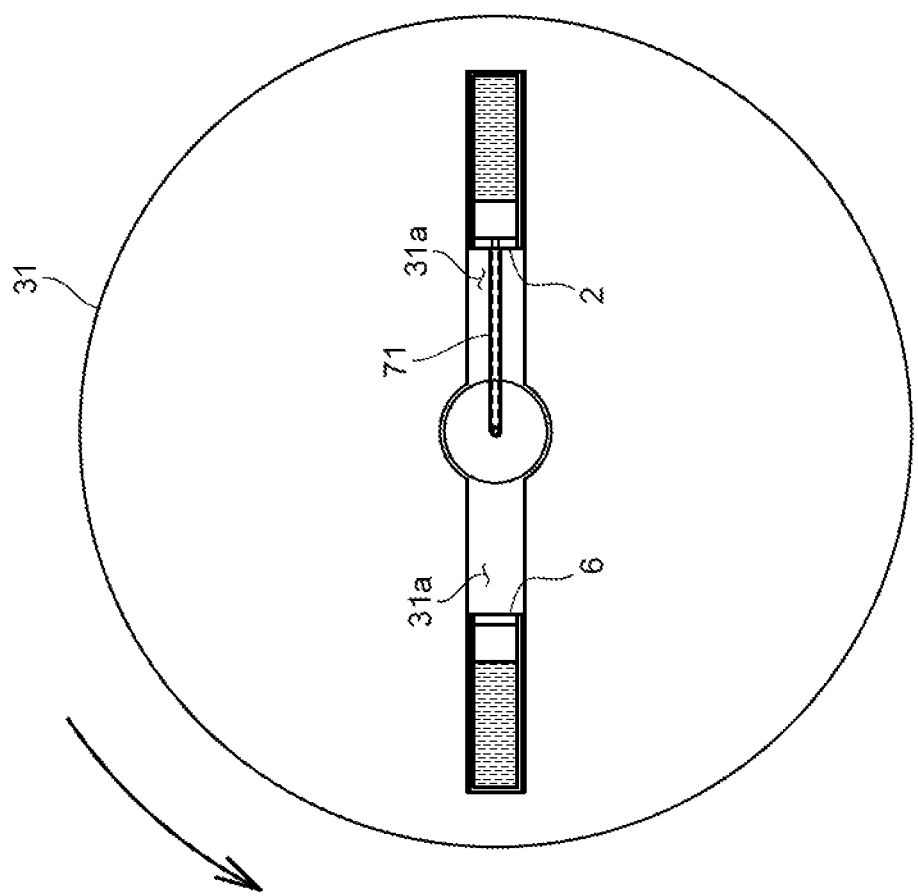
FIG. 2 A plan view of a cell holding body on which a cell is mounted in accordance with this embodiment.

The cell holding body 31 is, for example, a disk shape, as shown in FIG. 2, and the measurement cell 2 and the reference cell 6 are mounted on the cell holding body 31 across a center of rotation of the cell holding body 31. Here, the measurement cell 2 is mounted in a state wherein the direction of the density gradient is along the radial direction of the cell holding body 31. In addition, the cell holding body 31 has a mounting recess part 31a corresponding to a shape of the measurement cell 2, and the measurement cell 2 and the reference cell 6 are mounted by fittingly inserting into the mounting recess part 31a respectively. Furthermore, a guide mechanism (not shown in drawings) is arranged between the measurement cell 2 and the mounting recess part 31a and between the reference cell 6 and the mounting recess 31a. The guide mechanism comprises a guide rail arranged on the mounting recess part 31a or one of the cells 2, 6, and a guide groove arranged on the other. The guide rail or the guide groove arranged on the cell 2 or 6 may be provided integrally with the cell 2 or 6, or may be provided on a component mounted on the cell 2 or 6.

The measurement cell 2 and the reference cell 6 are configured to be detachable from the cell holding body 31. By making these cells 2 and 6 detachable from the cell holding body 31, the cells 2 and 6 become detachable from a main body of the device 100. When the cells 2 and 6 are dismounted from the main body of the device 100, an open/close lid 13 is in a state of being open. Since the measurement cell 2 is detachably mounted on the main body, it is possible to facilitate cleaning of the measurement cell 2 of the particle size distribution measuring device 100 that conducts the measurement of the particle size distribution by the use of the line start method. Especially, since the measurement cell 2 is detachable from the main body of the device 100 by making it detachable from the cell holding body 31, it is possible to facilitate the detaching work of the measurement cell 2 and to simplify handling the measurement cell 2 during cleaning.

In addition, a cover body 33 is arranged on an upper surface of the cell holding body 31 to prevent the measurement cell 2 and the reference cell 6 from accidentally getting out of place during rotation (refer to FIG. 1). By covering the upper surface of the cell holding body 31 with the cover 33, an uneven structure of the upper surface of the cell holding body 31 is reduced and the frictional resistance during rotation is reduced so that it is possible to make the cell holding body 31 easier to rotate and to reduce the frictional heat generated by rotation.

The measurement cell 2 is mounted on the cell holding body 31 in such a way that the one with the larger density is mounted on the outside in the radial direction of the cell holding body 31. In accordance with this arrangement, the centrifugal force is applied to the measurement cell 2 from the one with the smaller density gradient to the one with the larger density gradient as the cell holding body 31 rotates.

As shown in FIG. 1, the rotating part 32 comprises a rotation axis 321 connected to a center part of the lower surface of the cell holding body 31 and a motor 322 that rotates the rotation axis 321. The number of rotations of the motor 322 is controlled by a control part 10. The rotation axis 321 may be integrally formed with the cell holding body 31 or separately formed. In addition, the rotation axis 321 may comprise a single member or a plurality of members connected each other.

The above-mentioned cell holding body 31 is housed in a storage space (S) formed inside of a case (C) of the particle size distribution measuring instrument 100. The rotation axis 321 of the rotating part 32 penetrates a lower wall 11 forming the housing space (S). In addition, an upper wall 12 forming the housing space (S) is formed by the open/close lid 13 that is opened or closed when the measurement cell 2 is mounted or dismounted.

As shown in FIG. 1, the light irradiating part 4 is arranged below the rotation passage area (cell holding body 31) of the cells 2 and 6. The light irradiating part 4 of this embodiment is arranged below the lower wall 11 of the housing space (S) and irradiates the light toward the cells 2 and 6 through a light transmitting window (W1) formed in the lower wall 11. Concretely, the light irradiating part 4 has a light source 41 and a light focusing lens 42 that focuses the light emitted from the light source 41. The light emitted by the light irradiating part 4 is irradiated on the measurement cell 2 or the reference cell 6 through a light passage bore 31h formed in the cell holding body 31.

Figure 3:
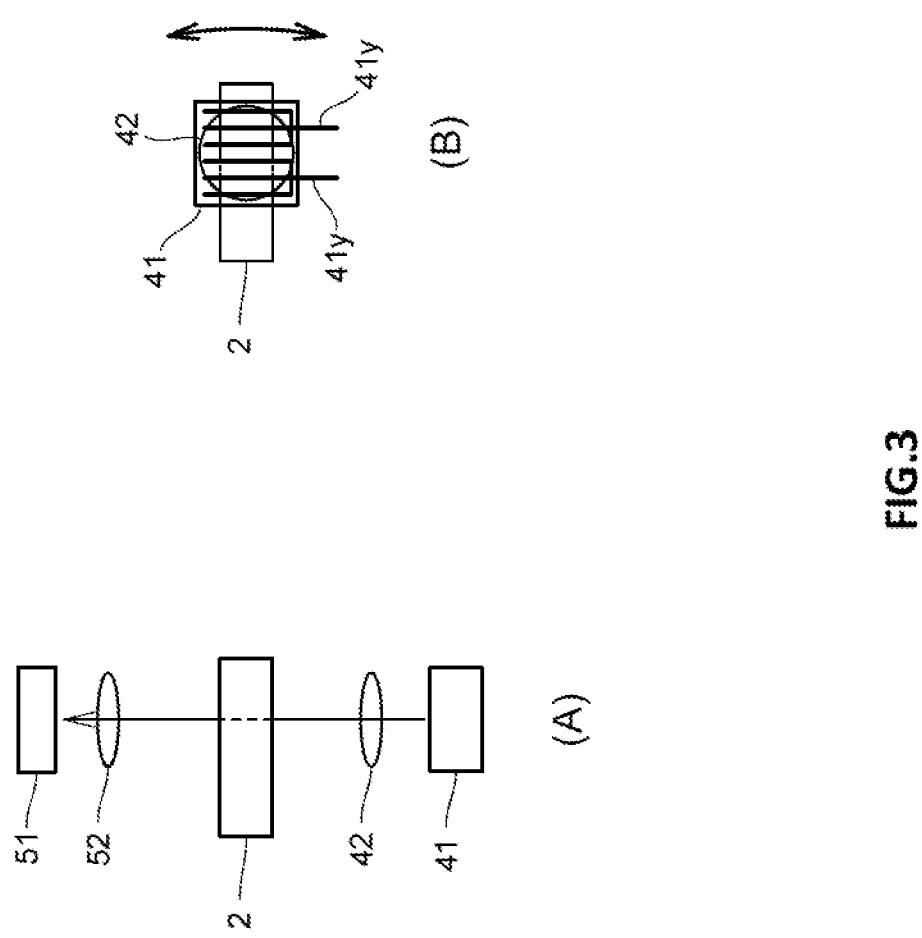
FIG. 3 Views each of which schematically shows a configuration of a light irradiating part in accordance with this embodiment; (A) is a view from a side, and (B) is a view from above.

The light source 41 is, as shown in FIG. 3, an LED having a pectinate electrode. The LED 41 is arranged in such a way that the wiring direction of its electrode is along the rotational direction of the cells 2 and 6.

As shown in FIG. 1, a light detecting part 5 is arranged above the rotation passage area (the cell holding body 31) of the cells 2 and 6. The light detecting part 5 of this embodiment is arranged above the upper wall 12 of the housing space (S) and detects the light that permeates the cells 2 and 6 through the light transmitting window (W2) formed in the upper wall 12. Specifically, the light detecting part 5 has a light detector 51 and a light focusing lens 52 that focuses the light detected by the light detector 51. The light detected by the light detecting part 5 is the light that passes through the cells 2 and 6, passes through a light passage bore 33h formed on the cover body 33, and is focused by the light focusing lens 52.

Here, the light focusing lens 42 of the light irradiating part 4 and the light focusing lens 52 of the light detecting part 5 are set so that an observation area by the light detector 51 is the light emitting area that does not include wiring 41y of the LED 41 arranged across the electrode. In accordance with this arrangement, an image of the wiring 41y of the LED 41 formed on the light detector 51 can be avoided so that it is possible to prevent the measurement accuracy from being degraded.

The light intensity signal obtained by the light detector 51 is obtained by the particle size distribution calculating part 15, and the particle size distribution data is calculated by the particle size distribution calculating part 15. The particle size distribution data is displayed on a display part (not shown in drawings).

Figure 4:
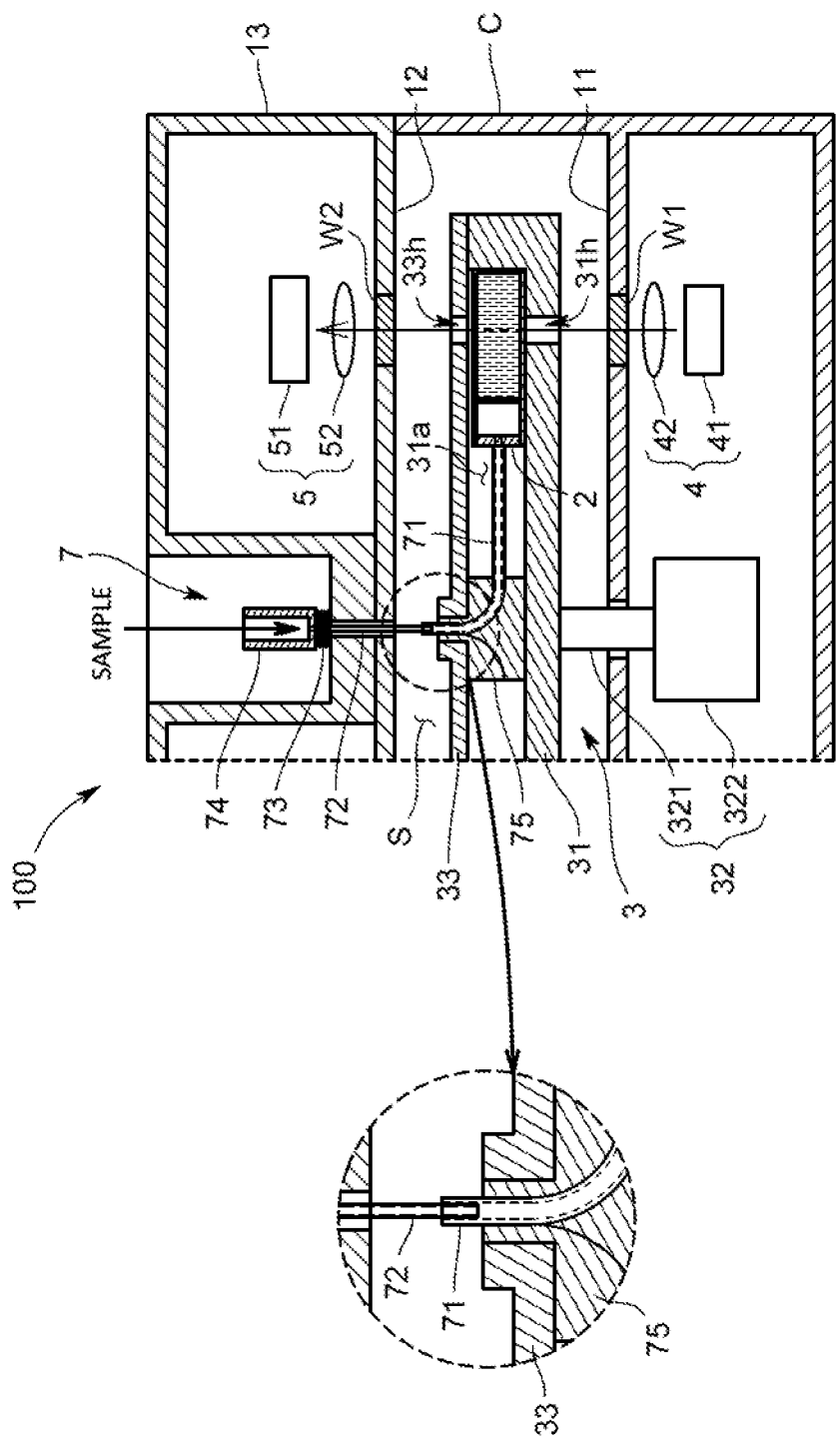
FIG. 4 A partial cross-sectional view schematically showing a state at a time when a measurement sample is introduced in accordance with this embodiment.

As shown in FIG. 1 and FIG. 4, the particle size distribution measurement device 100 of this embodiment comprises a sample introducing mechanism 7 that introduces the measurement sample into the measurement cell 2 that is rotated by the cell rotating mechanism 3.

The sample introducing mechanism 7 is arranged in the cell rotating mechanism 3, and has a sample introducing tube 71 whose one end is connected to the measurement cell 2 and whose other end opens at the rotation center part of the cell rotating mechanism 3.

The sample introducing tube 71 may be integrally formed with a cap of the measurement cell 2 or may be detachably connected to the cap of the measurement cell 2. In case that the sample introducing tube 71 and the cap of the measurement cell 2 are integrally formed, the sample introducing tube 71 can be detached from the cell holding body 31 as well as the measurement cell 2.

In this configuration, the other end of the sample introducing tube 71 is deformed into a curved shape, for example, a circular arc shape, by a deformation block 75 so that the opening of the other end faces upward.

In addition, the sample introducing mechanism 7 is arranged in an outside of the cell rotating mechanism 3 and has a sample introducing needle 72 that is capable of making advancing and retreating movements with respect to the other end part of the sample introducing tube 71, and an elastic body 73 that urges the sample introducing needle 72 in a retreating direction.

The sample introducing needle 72 is arranged on the open/close lid 13 locating at an upper part of the cell holding body 31 so that it can be moved up and down. At the upper end part of the sample introducing needle 72 provided is an injection part 74 into which the measurement sample is injected by, for example, a pipette. A distal end part of the pipette is inserted into the injection part 74 to inject the measurement sample, and the measurement sample is introduced from the sample introducing needle 72 into the sample introducing tube 71 through the injection part 74.

The elastic body 73 is, for example, a coil spring, and urges the sample introducing needle 72 upward so that the sample introducing needle 72 is housed from a bottom surface of the open/close lid 13 to the upper side.

In this sample introducing mechanism 7, in case of introducing the measurement, for example, the pipette is inserted into the injection part 74 and the sample introducing needle 72 is pushed downward. With this procedure, the sample introducing needle 72 is in a state of being inserted into the other end part of the sample introducing tube 71. In this state, when the measurement sample is injected into the injection part 74, the measurement sample is introduced into the sample introducing tube 71 from the sample introducing needle 72. As mentioned above, since the sample introducing needle 72 is capable of making advancing and retreating movements with respect to the other end part of the sample introducing tube 71 and the measurement sample is introduced in a state wherein the sample introducing needle 72 is inserted into the other end part of the sample introducing tube 71, it is possible to make it easy to introduce the measurement sample into the sample introducing tube 71.

On the other hand, after the measurement sample is introduced, when the pipette is removed from the injection part 74, the sample introducing needle 72 moves upward by the elastic recovery force of the elastic body 73, and the sample introducing needle 72 retreats to the upper side of the lower surface of the open/close lid 13. As mentioned above, since the sample introducing needle 72 retreats from the other end part of the sample introducing tube 71 by the elastic body 73 after the sample is introduced, it is possible to avoid interference of rotation of the cell rotating mechanism 3 or to prevent the sample introducing needle 72 and the sample introducing tube 71 from being damaged because the sample introducing needle 72 makes contact with the sample introducing tube 71 when the cell rotating mechanism 3 rotates. After the measurement sample is introduced, the sample introducing tube 71 is closed to prevent volatilization of the measurement sample during the measurement, and a shut-off mechanism may be arranged to shut off the internal space of the measurement cell 2 from the outside. As an example of this shut-off mechanism, a lid that closes the opening of the other end of the sample introducing tube 71 may be arranged.

When the measurement sample is introduced into the measurement cell 2 by the use of the sample introducing mechanism 7, the particle size distribution measurement by the line start method is started. In accordance with the line start method, the time after introducing the measurement sample is measured, and it is necessary to start the measurement by pressing a measurement start button (not shown in drawings) of the particle size distribution measuring device 100.

In this embodiment, a labor for the user simultaneously to introduce the measurement sample and to press the measurement start button of the device 100 is eliminated since the timing for introducing the measurement sample is controlled by the device 100. Concretely, the particle size distribution measuring device 100 has a reporting part 14 that informs the user of a start timing of the line start method using the sample introducing mechanism 7. The reporting part 14 informs the user of the timing of introducing the sample, for example, by sound. It is conceivable that the sample introducing timing is notified, for example, by countdown. In addition, the sample introducing timing may also be indicated on a display (not shown in drawings). The particle size distribution calculating part 15 starts the measurement of the particle size distribution at this sample introducing timing. As mentioned, since the sample introducing timing is reported by the reporting part 14, it is possible to make it easy to match the sample introducing timing with the measurement start timing of the line start method.

Figure 5:
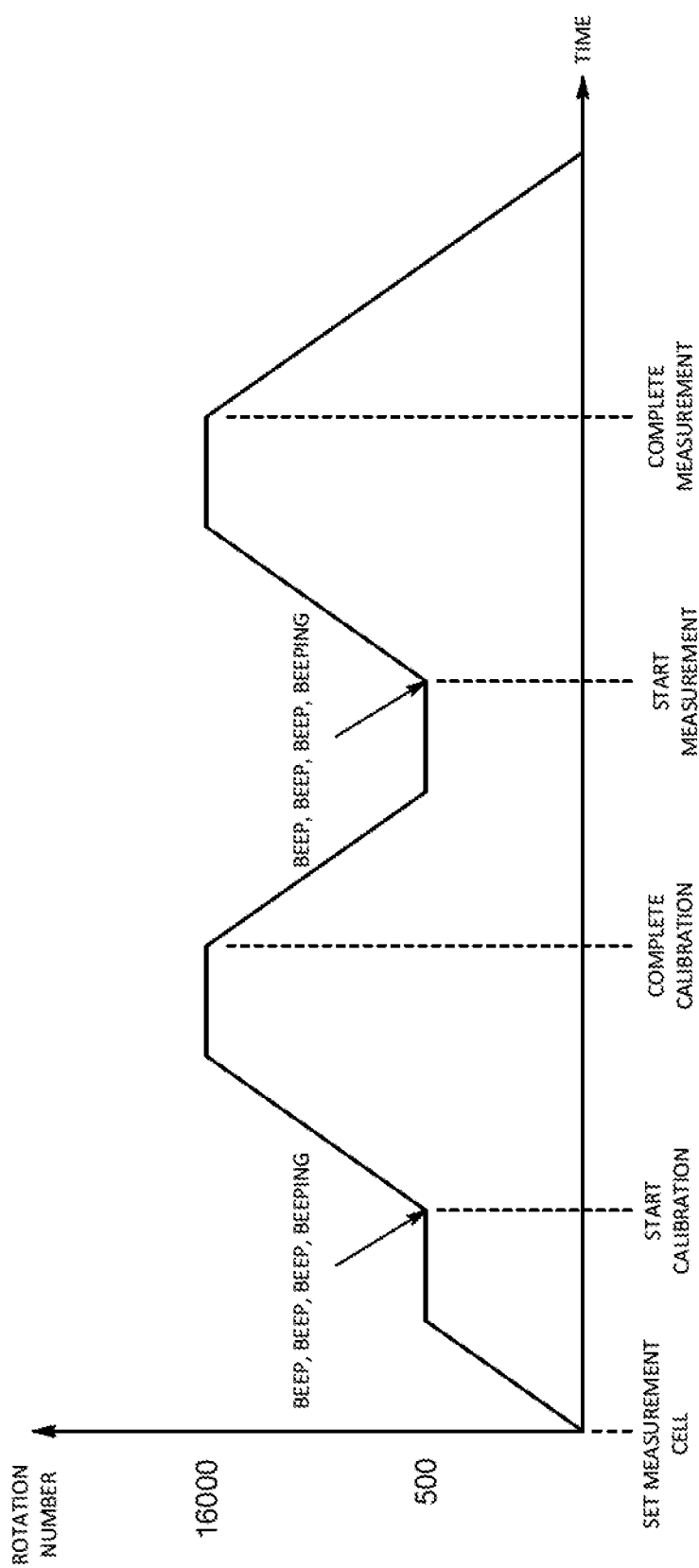
FIG. 5 A schematic view showing a measuring procedure of the particle size distribution measuring device and a manner of reporting by the reporting part in accordance with this embodiment.

Next, the measurement procedure of the particle size distribution measuring device 100 will be briefly explained with reference to FIG. 5, together with a manner in which the reporting part 14 informs the user.

First, the empty measurement cell 2 is set in the cell holding body 31.

Press a "Ready" button that indicates completion of preparation, press a "START" button to start rotation and wait until the measurement cell 2 reaches the set rotation speed (for example, 500 rpm) by the cell rotating mechanism 3.

Subsequently, a plurality of sucrose solutions with different concentrations are injected into the measurement cell 2 from the high concentration side through the sample introducing mechanism 7 to form a density gradient solution in the measurement cell 2.

Then, press a "Cal" button for calibration, and press the "START" button, and then the reporting part 14 starts "beep, beep, beep, beeping". At a timing of the last "beeping", introduce a calibration solution into the measurement cell 2 through the sample introducing mechanism 7. The timing of the last "beeping" is a timing of introducing the calibration solution/rotation rise start/start of data acquisition. At this timing, the measurement of the calibration solution starts.

When the measurement of the calibration solution is completed, press the "Ready" button and the "START" button to return to the rotation of 500 rpm.

Then, press a "Meas" button to start the measurement, and press the "START" button, and then the reporting part 14 starts "beep, beep, beep, beeping". At the timing of the last "beeping, introduce the measurement sample into the measurement cell 2 through the sample introducing mechanism 7. The timing of the last "beeping" is the timing of introducing the measurement sample/rotation rise start/start of data acquisition. At this timing, the measurement of the measurement sample starts.

Figure 6:
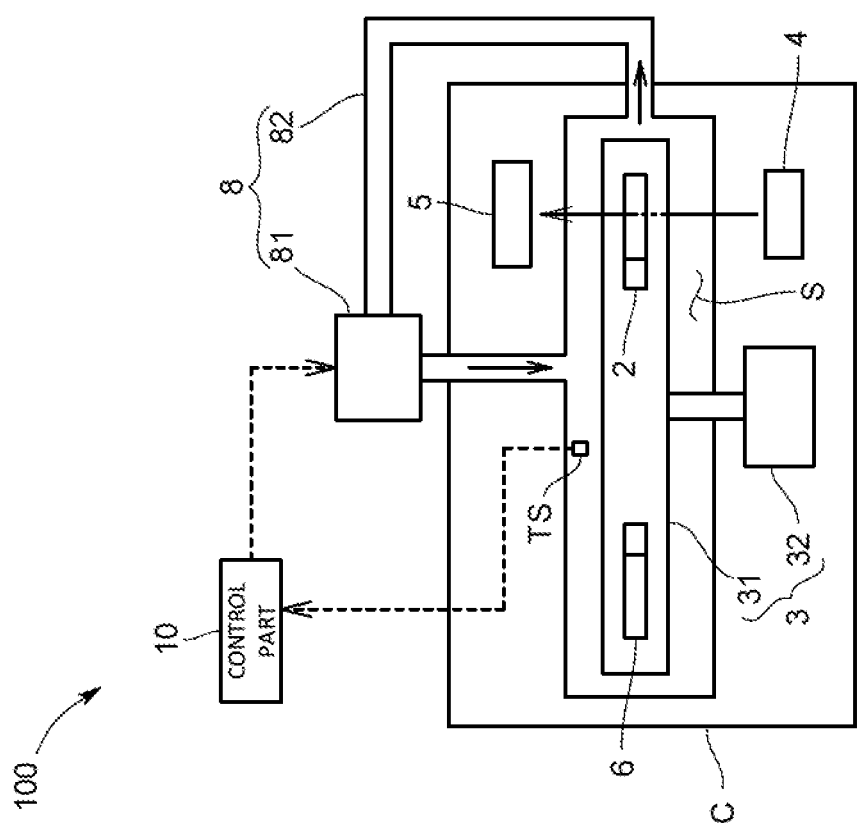
FIG. 6 A view schematically showing a configuration of the centrifugal sedimentation type particle size distribution measuring device in accordance with a modified embodiment.

As shown in FIG. 6, the particle size distribution measuring device 100 of this embodiment further comprises a cooling mechanism 8 that cools the cells 2 and 6.

The cooling mechanism 8 cools the cells 2 and 6 by supplying cold air to a housing space (S) that houses the cell holding body 31 in a rotatable manner. Concretely, the cooling mechanism 8 comprises a cooler 81 and a supply channel 82 that supplies a gas cooled by the cooler 81 to the housing space (S). The cooler 81 uses a cooling heat exchanger and may use a Peltier element or a cooling medium. In FIG. 6, an example is shown where the cooler 81 is arranged outside the case (C) of the device 100, but it can also be arranged inside the case (C).

In addition, one end of the supply channel 82 is connected to a space part that is formed on an upper wall of the housing space (S) and that is for introducing the measurement sample, and the other end of the supply channel 82 is connected to an outside of the housing space (S) in the radial direction. The space part is a space into which a sample introducing appliance such as a pipette or the like is inserted and a space that is formed for arranging an internal flow channel of the sample introducing needle 72 or the sample introducing needle 72. Concretely, the one end of the supply channel 82 is connected to an upper opening of the space part formed on the upper wall of the housing space (S), and the other end of the supply channel 82 opens on a side wall of the housing space (S). In this arrangement, the other end of the supply channel 82 opens on the side wall locating in a side where the light irradiating part 4 and the light detecting part 5 are arranged.

In the supply channel 82 connected in this way, the one end connected to the space part becomes a negative pressure and the other end connected to outside in the radial direction becomes a positive pressure. The gas flows in the supply channel 82 from the other end to the one end. On the way, the gas is cooled by the cooler 81, and the cooled gas is supplied to the center part of the housing space (S) through the one end. The cooled gas then flows radially outward in the housing space (S) and flows into the other end of the supply channel 82. Then, the gas circulates through the supply channel 82. Since the circulation path passes a measurement area where the light irradiating part 4 and the light detecting part 5 are arranged, it is possible to improve the cooling performance in the measurement area. A circulation pump to circulate the gas may be arranged in the supply channel 82.

The cooler 81 of the cooling mechanism 8 is controlled by a control part 10. Concretely, a temperature sensor (TS) to detect the temperature in the housing space (S) is provided, and the cooler 81 is controlled based on the detected temperature by the temperature sensor (TS). In case that the circulation pump is provided, the control part 10 may control the rotation speed of the circulation pump to adjust the circulation flow rate.

Since the temperature in the housing space (S) can be kept constant by means of the cooling mechanism 8, it is possible to keep viscosity, density or a refractive index of the dispersion medium as being the density gradient solution constant and to measure a sedimentation velocity of the particles accurately. As a result of this, the particle size distribution can be accurately measured. In addition, since the inner surface of the housing space (S) (especially the upper and lower surfaces) is flush without unevenness, it is possible to reduce temperature irregularities without localized frictional heat and to keep the temperature in the housing space (S) much more constant together with the effect by the cooling mechanism 8.

In addition, the particle size distribution calculating part 15 of the particle size distribution measuring device 100 may correct the temperature of the particle size distribution data calculated based on the light intensity signal from the light detector 51 by the use of the detected temperature of the temperature sensor (TS).

Effect of this Embodiment

In accordance with the centrifugal sedimentation type particle size distribution measuring device 100 of this embodiment, since the cell is cooled by the cooling heat exchanger 81, viscosity, density or a refractive index of the dispersion medium can be kept constant so that it is possible to measure a sedimentation velocity of the particles accurately. As a result of this, the particle size distribution can be accurately measured.

Since the one end of the supply channel 82 is connected to the space part to introduce the measurement sample into the measurement cell 2 that is rotated by the cell rotating mechanism 3, it is possible to make it easy to introduce the cooled gas into the housing space (S) by taking advantage of a characteristic that the rotation center part of the cell holding body 31 becomes a negative pressure in the housing space (S).

In addition, since the gas in the housing space (S) is configured so as to circulate through the supply channel 82, it is possible to make it easy to keep the temperature in the housing space (S) constant.

OTHER MODIFIED EMBODIMENT

The present claimed invention is not limited to the above-mentioned embodiments.

The following is conceivable as a configuration of the supply channel 82 of the cooling mechanism 8.

Figure 7:
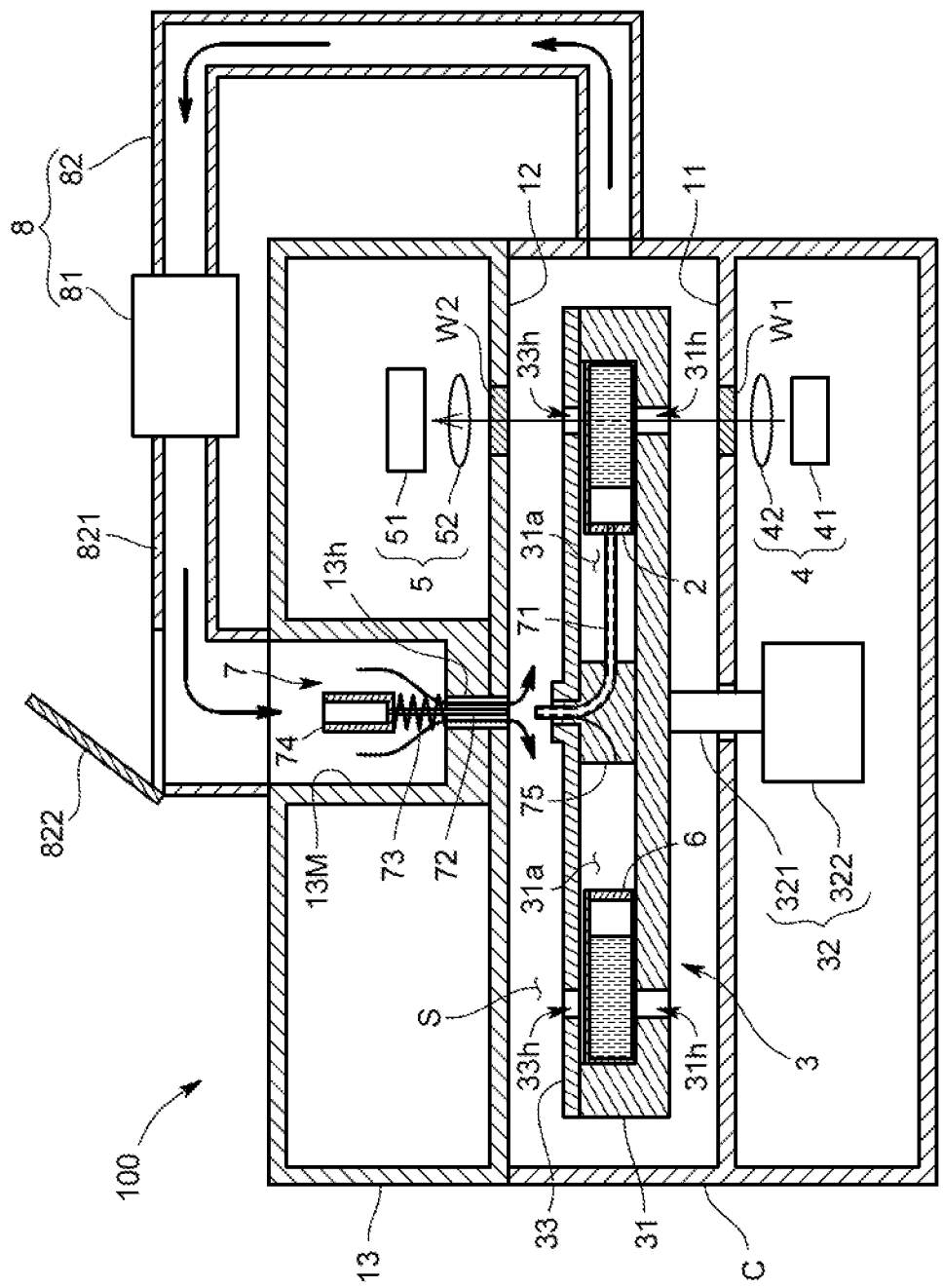
FIG. 7 A view schematically showing a configuration of the centrifugal sedimentation type particle size distribution measuring device in accordance with a modified embodiment.
Figure 8:
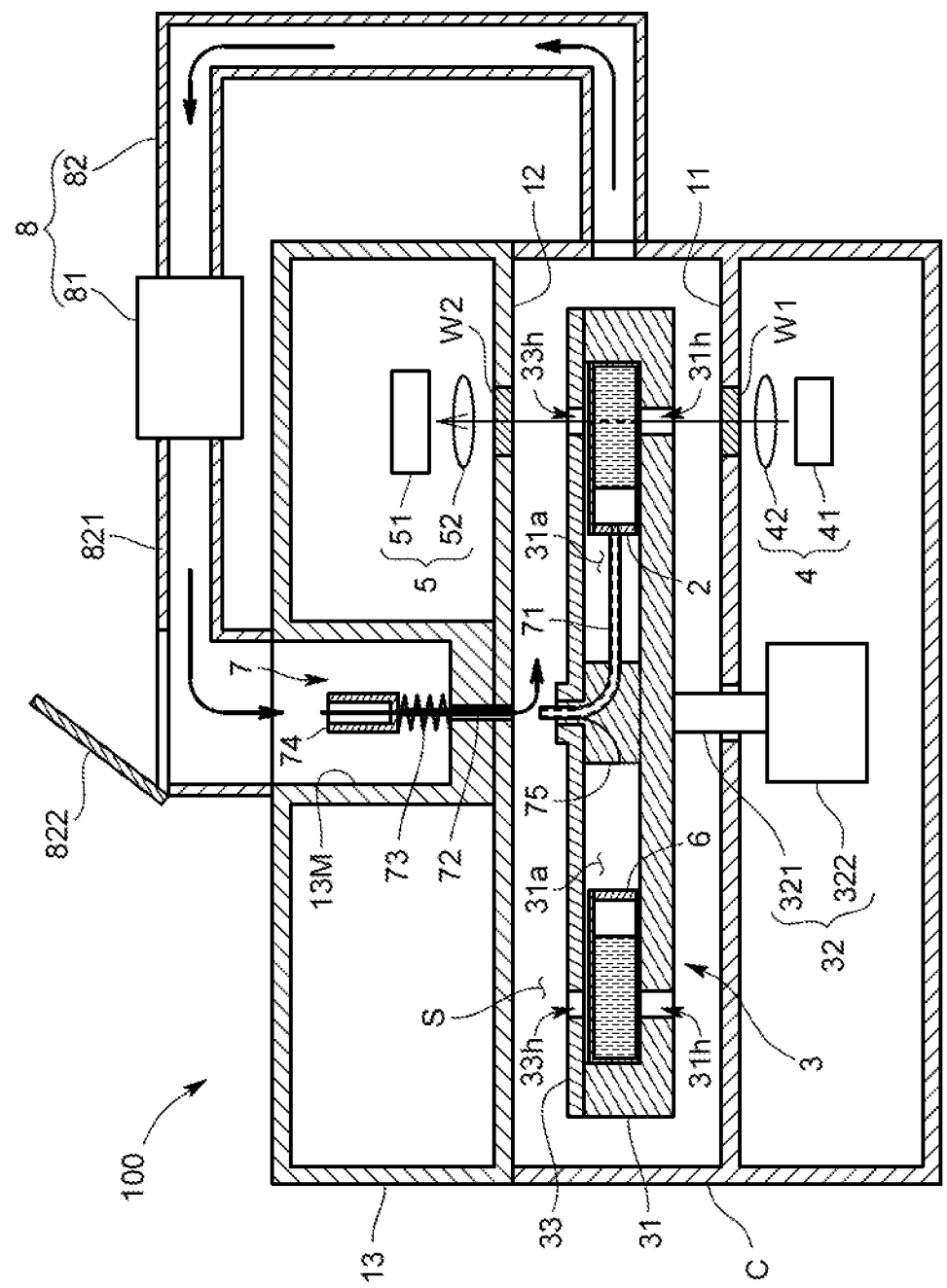
FIG. 8 A view schematically showing a configuration of the centrifugal sedimentation type particle size distribution measuring device in accordance with a modified embodiment.
Figure 9:
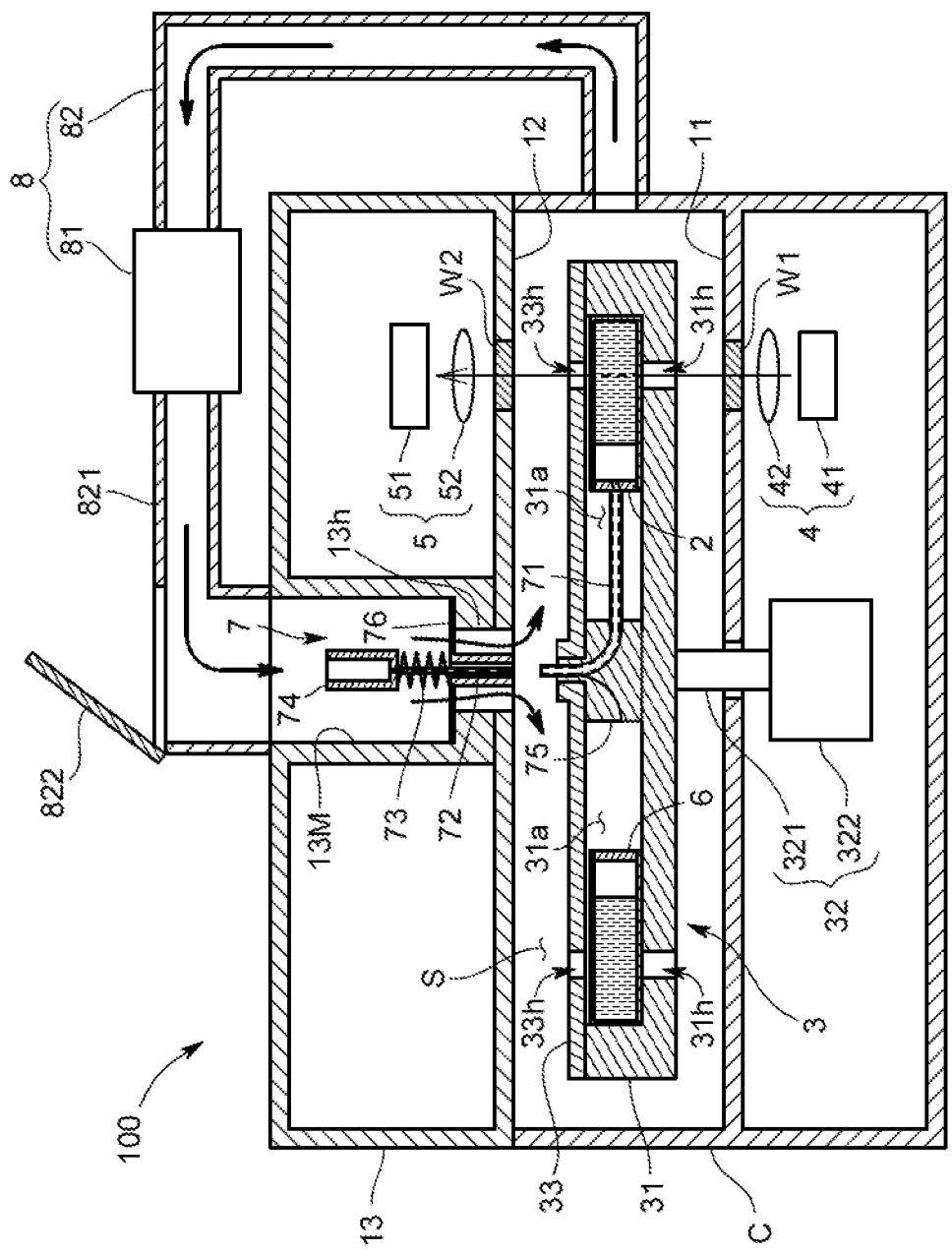
FIG. 9 A view schematically showing a configuration of the centrifugal sedimentation type particle size distribution measuring device in accordance with a modified embodiment.
Figure 9:
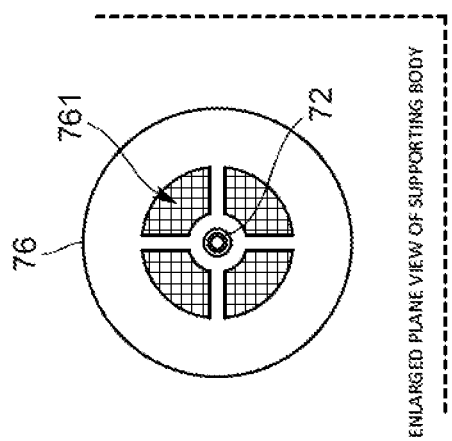

As shown in FIG. 7, FIG. 8 and FIG. 9, one end of the supply channel 82 may be connected to a portion (a space part) where the sample introducing mechanism 7 is arranged in the open/close lid 13. In FIG. 7, FIG. 8 and FIG. 9, the one end of the supply channel 82 is connected to a concave part 13M where the sample introducing needle 72 of the sample introducing mechanism 7 is arranged. In an example of FIG. 7, the cooled gas is introduced from a space between the sample introducing needle 71 and a through bore 13h of the open/close lid 13 into which the sample introducing needle 72 sticks. In an example of FIG. 8, the cooled gas is introduced from an internal flow channel of the sample introducing needle 72. In an example of FIG. 9, for example, a mesh-shaped ventiduct 761 is arranged on a support body 76 that supports the sample introducing needle 72. The support body 76 is mounted on the through bore 13h of the open/close lip 13.

Figure 10:
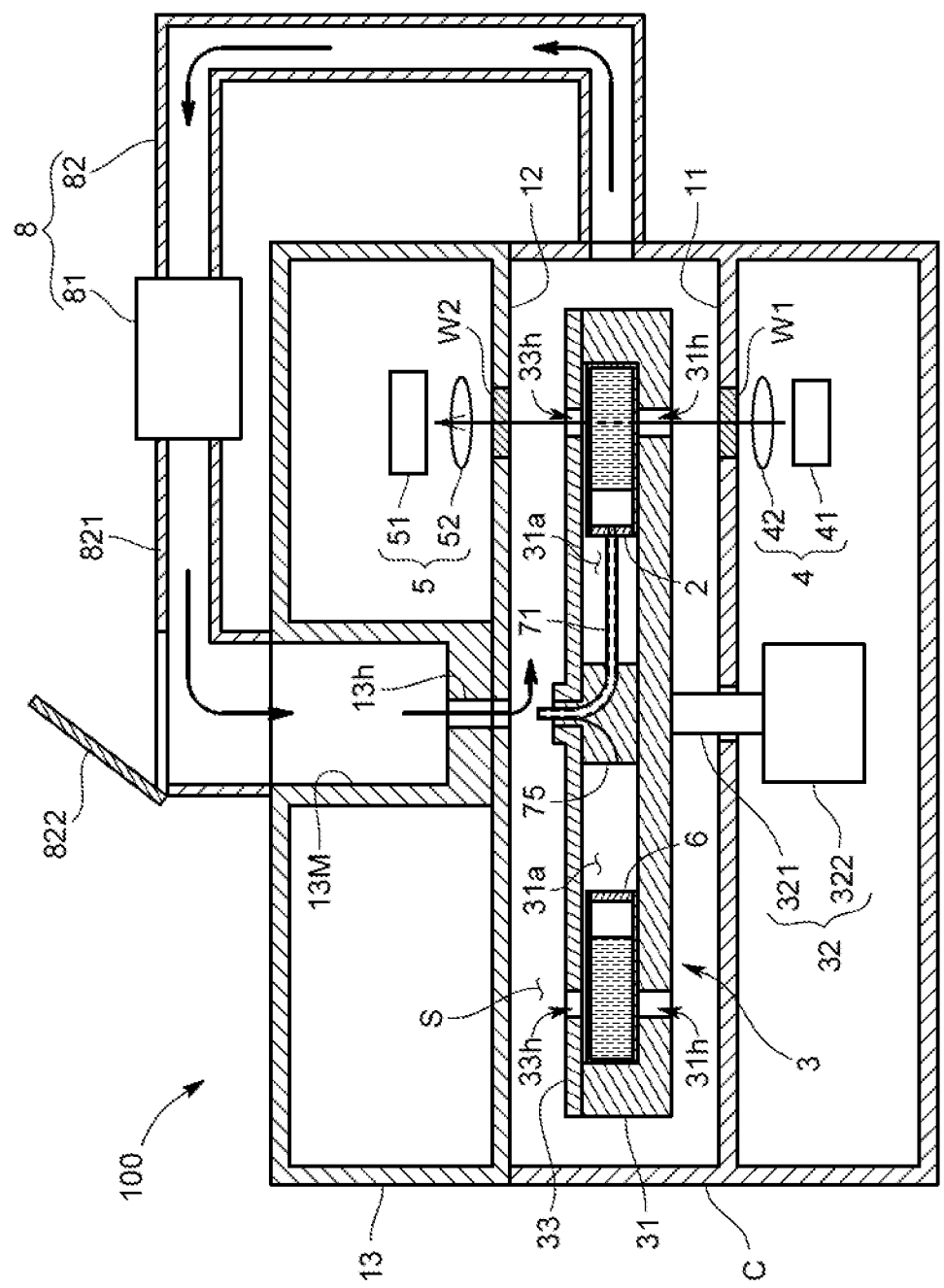
FIG. 10 A view schematically showing a configuration of the centrifugal sedimentation type particle size distribution measuring device in accordance with a modified embodiment.

In addition, as shown in FIG. 10, it is conceivable that sample introducing mechanism 7 is so configured that the sample is directly injected into the sample introducing tube 71 using a pipette or the like without the sample introducing needle 72 and the elastic body 73. In this case, a through bore 13h is formed on the open/close lid 13 as a space part that is to introduce the sample and into which the pipette or the like is inserted. In case of this configuration, the one end of the supply channel 82 is connected in communication with the through bore 13h. In FIG. 10, since the through bore 13*h* is formed on a bottom part of the concave part 13M, the one end of the supply channel 82 is connected to the concave part 13M.

In the configuration of FIG. 7 through FIG. 10, a lid 822 is arranged on a piping 821 constituting the supply channel 82 in order to introduce the sample by the use of the pipette or the like. It is possible to introduce the sample by opening the lid 822. It is possible to introduce the sample into the housing space (S) without leaking the cooled gas by closing the lid 822 after the sample introduced.

In the above embodiment, the particle size distribution is measured by the line start method, but it can be measured not by the line start method but by the uniform sedimentation method. In addition, the particle size distribution may be measured by switching the line start method and the uniform sedimentation method. In this case, the measurement cell 2 houses the sample dispersion solution in which the particles are dispersed in the medium. In addition, in accordance with the line start method, the timing of introducing the measurement sample or the timing of pressing the measurement start button after introducing the measurement sample is the measurement start timing, while in accordance with the uniform sedimentation method, the timing of starting the rotation of the measurement cell that houses the sample dispersion solution is the measurement start timing.

Figure 11:
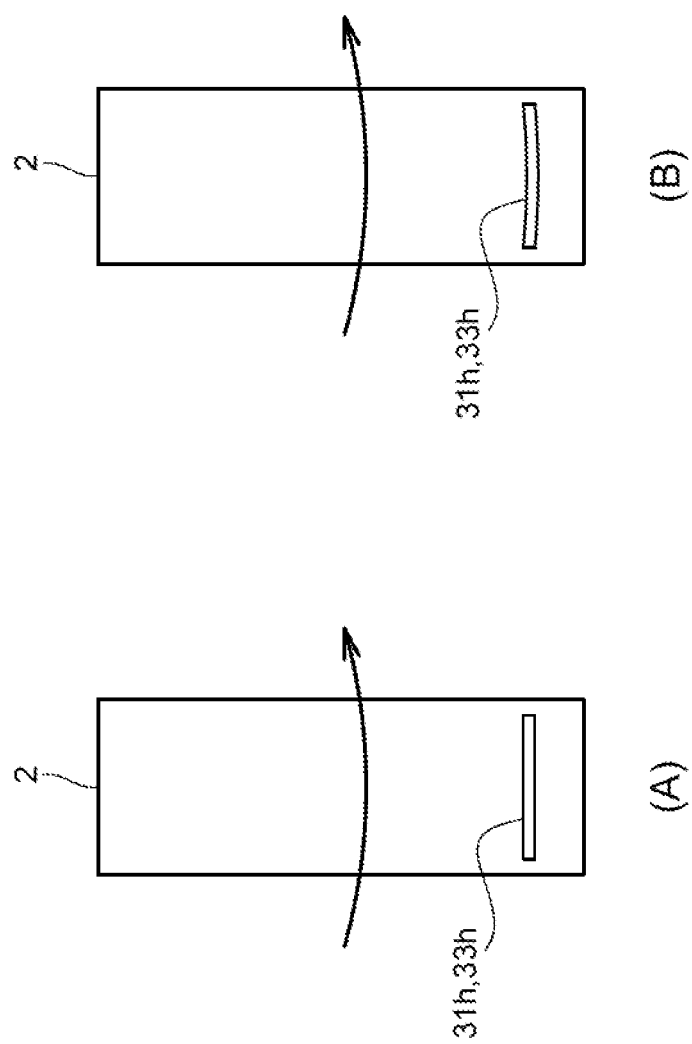
FIG. 11 A schematic view showing a modified form of a translucent window.

It is conceivable that an opening shape of the light passage bore 31*h* of the cell holding body 31 and the light passage bore 33*h* of the cover body 33 in the above-mentioned embodiment is circular, however, in this case, the circular shape must be made smaller in order to improve the resolution. As a result of this, there is a problem that the amount of the light decreases. For this reason, it is conceivable that at least one of the light passage bores 31*h* and 33*h* is made into a straight slit shape extending in a straight line along a tangential direction of the rotation of the cell holding body 31 as shown in FIG. 11 (A), or into a circular arc slit shape extending in a circular arc in the direction of the rotation of the cell holding body 31 as shown in FIG. 11 (B). As mentioned above, it is possible to improve the resolution while preventing a decrease in the amount of the light by making the light passage bores 31*h* and 33*h* slit shapes. The light passage bore 31*h* of the cell holding body 31, which is in the light input side, should be narrowed to reduce stray light, and the light passage bore 33*h* of the cover body 33, which is in the light output side, should be the above-mentioned slit shape in order to improve the resolution.

Figure 12:
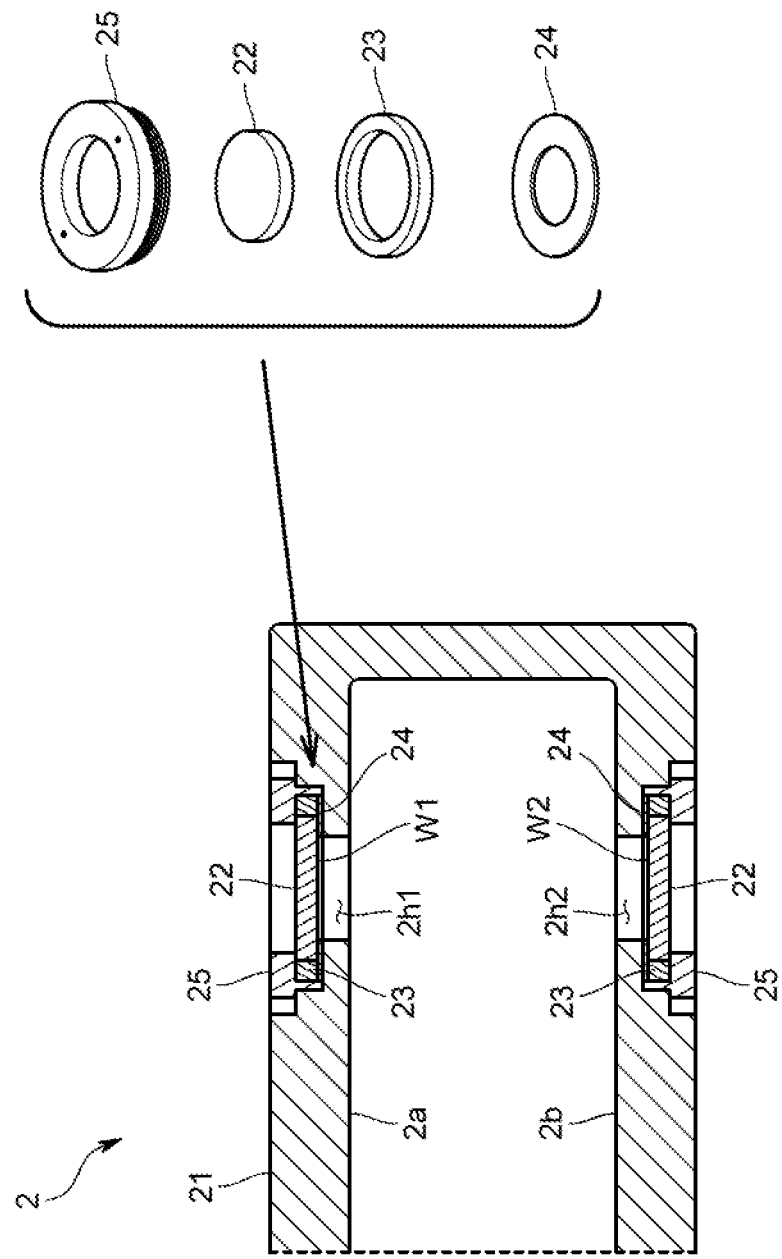
FIG. 12 A cross-sectional view and an exploded view showing a modified form of the measurement cell.

In addition, as shown in FIG. 12, the measurement cell 2 may have a metal cell body 21 forming a space inside of which the measurement sample is stored, and window members 22 arranged on opposite walls 2*a* and 2*b* orthogonal to the centrifugal force direction of the cell body 21. The opposite walls 2*a* and 2*b* have flat plate portions, and the window members 22 are arranged on the flat plate portions of the opposite walls 2*a* and 2*b*. It is conceivable that the window member 22 is arranged so that its inner surface is located on the same plane as that of the inner surface of the flat portions of the opposite walls 2*a* and 2*b* or outside the inner surface of the flat portions of the opposite walls 2*a* and 2*b*. In accordance with this arrangement, when the measurement cell 2 rotates, since the centrifugal force of the measurement sample is not applied to the window member 22 and only the centrifugal force of the window member 22 itself is applied to the window member 22, it is possible to prevent the window member 22 from being damaged.

Concretely, the measurement cell 2 is a metal cell made of, for example, aluminum. As shown in FIG. 12, translucent windows W1 and W2 for transmitting the light are arranged on the opposite walls 2*a* and 2*b* facing each other. By making the cell 2 made of metal, it is possible to make the cell 2 strong enough to withstand the centrifugal force and superior in chemical resistance. In this example, the measurement cell 2 has a bottomed cell body 21 made of metal and a resin cap (not shown in drawings) that seals an opening of the cell body 21.

The translucent windows W1 and W2 are made by installing the window members 22 made of glass in the through bores 2*h*1 and 2*h*2 formed in the opposite walls 2*a* and 2*b* of the cell body 21. Since the window member 22 is made of glass, it has the excellent chemical resistance. The window member 22 in this example has a disk shape and is inserted into a ring-shaped member 23 made of metal. A structure body wherein the window member 22 is inserted into the ring-shaped member 23 is mounted on the through bores 2*h*1 and 2*h*2 through a seal member 24 and is fixed to the side walls 2*a* and 2*b* by a holding member 25. At this time, it is so configured that a tightening force of the holding member 25 is transmitted to the ring-shaped member 23 to prevent the window member 22 from being broken. Although a force of about 30,000 G is applied to the window member 22, only the centrifugal force that is a value obtained by multiplying the mass of the window member 22 by 30,000 G is applied to the window member 22 so that the window member 22 is hardly broken. If the entire cell is made of glass and the sample is contained inside of the cell, the centrifugal force of (mass of the cell+mass of the sample) multiplied by 30,000 G is applied and the cell breaks.

Figure 13:
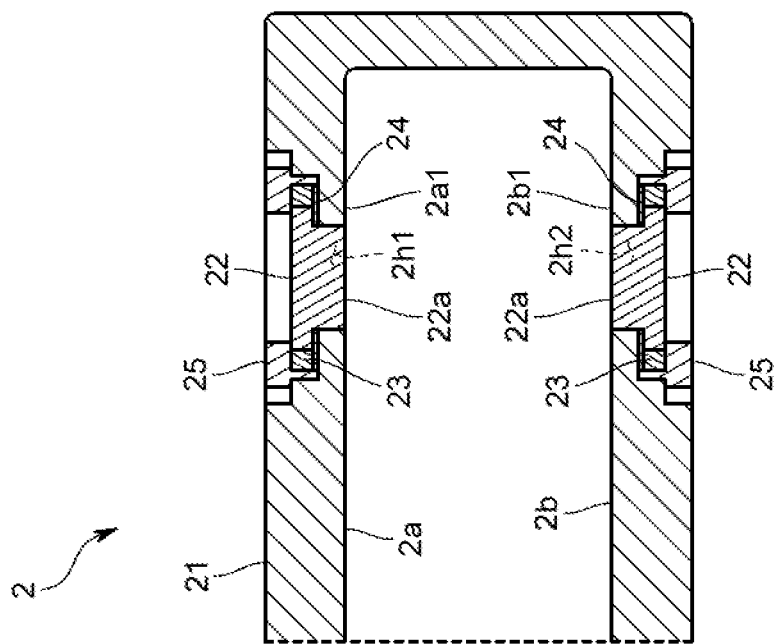
FIG. 13 A cross-sectional view showing a modified form of the measurement cell.

In addition, as shown in FIG. 13, the inner surface 22*a* of the window member 22 may be so configured to be flush with the inner surfaces 2*a*1 and 2*b*1 of the opposite walls 2*a* and 2*b*. In other words, the window member 22 is configured to block the inner openings of the through bores 2*h*1 and 2*h*2. This configuration eliminates the unevenness caused by the through bores 2*h*1 and 2*h*2. As a result of this, it is possible to solve problems such as disturbance of the density gradient in the cell and non-uniform settling of particles.

Figure 14:
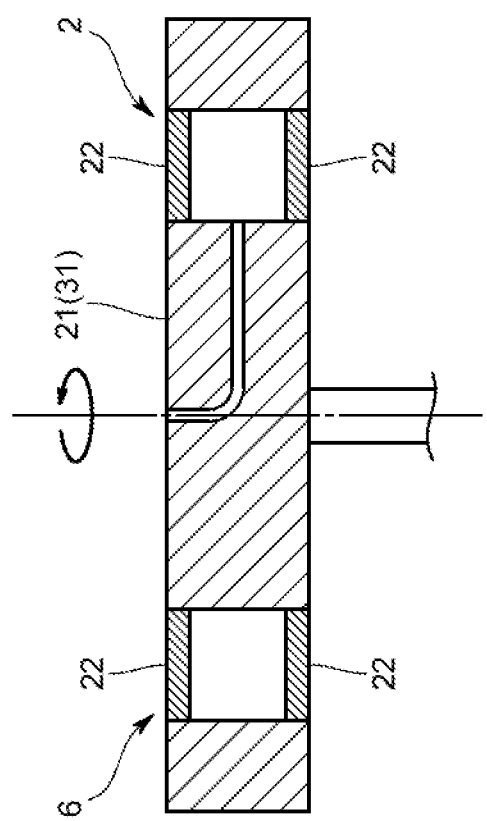
FIG. 14 A cross-sectional view showing a modified form of the measurement cell.

Furthermore, as shown in FIG. 14, the measurement cell 2 and the cell holding body 31 can be integrally configured. In this case, the cell holding body 31 serves as a cell body 21 inside of which forms a space for storing the measurement sample, and the window members 22 are arranged on the opposite walls 2*a* and 2*b* orthogonal to the centrifugal force direction of the cell body 21. In accordance with this arrangement, since only the centrifugal force of the window member itself is applied to the window member without applying the centrifugal force of the measurement sample to the window member, it is possible to prevent the window member from being damaged.

Figure 15:
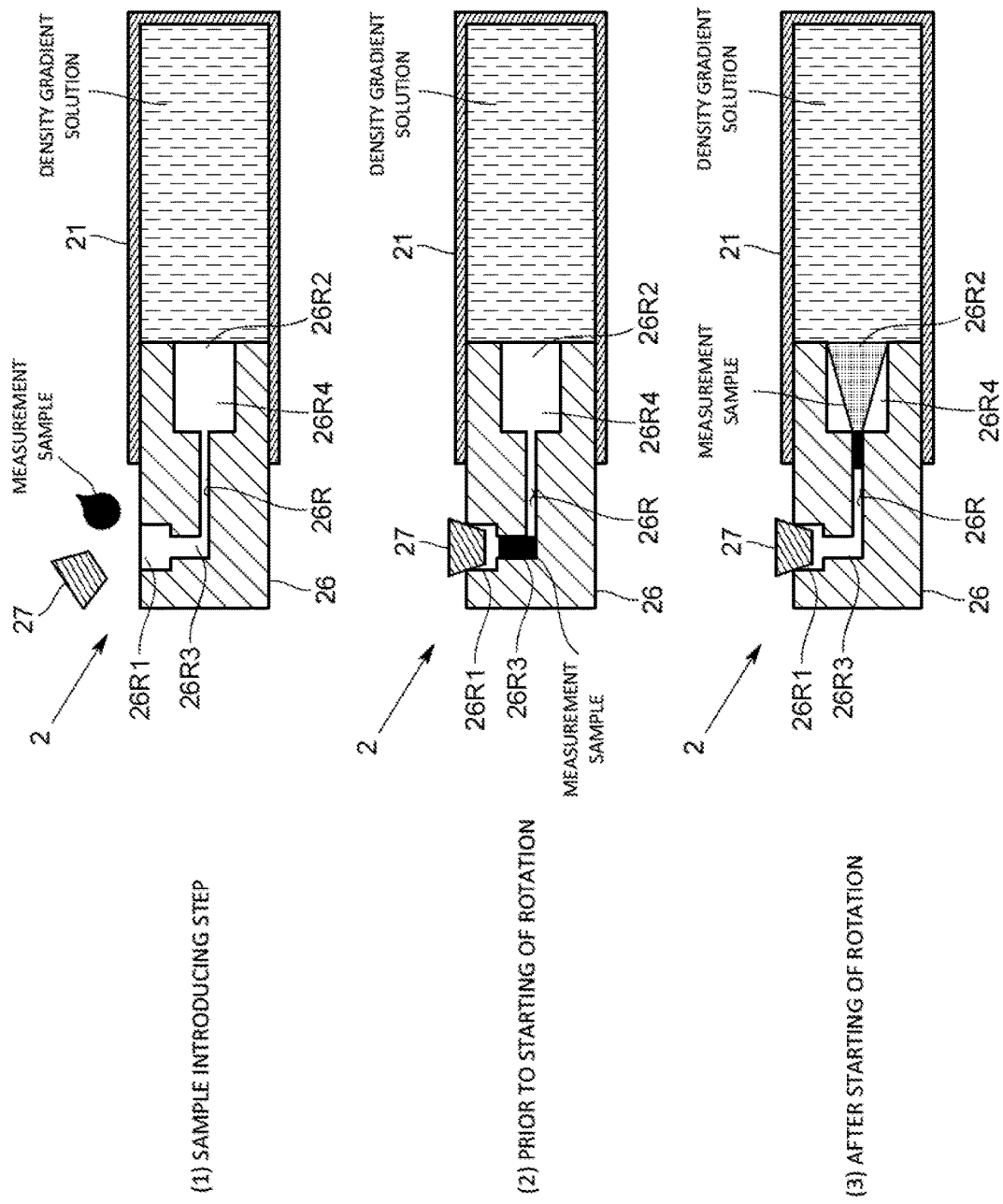
FIG. 15 Cross-sectional views of a modified form of the measurement cell, each of which shows (1) a stage of preparing a sample, (2) a state before rotation is started, and (3) a state after rotation is started.

In addition, the configuration of the measurement cell 2 may be as shown in FIG. 15. In this configuration of the measurement cell 2, the sample introducing mechanism 7 of the above-mentioned embodiment is not necessary. This measurement cell 2 comprises a cell body 21 that has an opening part 21H at one end and that houses the density gradient solution, and a cell cap 26 that seals the opening part 21H of the cell body 21 and inside of which an internal flow channel 26R to hold the measurement sample is formed. The internal flow channel 26R formed in the cell cap 26 has a sample introducing port 26R1 formed at one end and a sample outlet port 26R2 formed at the other end. In a state wherein the cell cap 26 is mounted on the cell body 21, the sample introducing port 26R1 is located outside the cell body 21, and the sample outlet port 26R2 is located inside the cell body 21. In addition, a holding flow channel part 26R3 that temporarily holds the measurement sample, and an enlarged flow channel part 26R4 that is arranged in a downstream side of the holding flow channel part 26R3 and that communicates with the sample outlet port 26R2 are arranged between the sample introducing port 26R1 and the sample outlet port 26R2 in the internal flow channel 26R. The sample introducing port 26R1 and the holding flow channel part 26R3 are arranged along the rotational axis direction of the measurement cell 2, and the enlarged flow channel part 26R4 is arranged along the direction of the centrifugal force applied to the measurement cell 2 (rotational radial direction).

In case of introducing the measurement sample into the measurement cell 2 having the above-mentioned arrangement, as shown in FIG. 15 (1), the measurement sample is introduced through the sample introducing port 26R1 in a state wherein the cell cap 26 is mounted on the cell body 21. After the measurement sample is introduced, the measurement sample is held by the holding flow channel part 26R3 (refer to FIG. 15(2)). In addition, after the measurement sample is introduced, the sample introducing port 26R1 may be closed with a lid body 27. By closing the sample introducing port 26R1 with the lid body 27, it is possible to prevent evaporation of the measurement sample and to prevent the density gradient solution from leaking out to the internal flow channel 26R side due to air accumulation in the internal flow channel 26R. Then, when the measurement cell 2 is rotated, the measurement sample moves from the holding flow channel part 26R3 to the enlarged flow channel part 26R4 by the centrifugal force. At this time, as shown in FIG. 15 (3), the measurement sample from the holding flow channel part 26R3 spreads in the enlarged flow channel part 26R4 and is introduced into the density gradient solution from the sample outlet port 26R2. This prevents a streaming phenomenon from occurring. In case that there is no enlarged flow channel part 26R4 and the internal flow channel 26R has a single diameter, the measurement sample is introduced into the density gradient solution as a lump, and the streaming phenomenon causes problems such as inaccurate measurement of the particle size distribution.

In the above-mentioned embodiment, the cells 2 and 6 become detachable from the main body of the device 100 by making the cells 2 and 6 detachable from the cell holding body 31, however, the measurement cell 2 may be so configured to be detachable from the main body of the device 100 by making the cell holding body 31 detachable from the main body of the device 100. In this case also, in order to facilitate cleaning the measurement cell 2, it is preferable to make the measurement cell 2 detachable from the cell holding body 31.

In addition, the embodiments may be various modified or combined without departing from a spirit of the present claimed invention.

POSSIBLE APPLICATIONS IN INDUSTRY

In accordance with the present claimed invention, it is possible to keep the temperature of the dispersion medium constant by improving the cooling efficiency of the cell so that the measurement accuracy can be improved.

The invention claimed is:

1. A centrifugal sedimentation type particle size distribution measuring device comprising
a cell holding body that holds a cell in which a measurement sample and a dispersion medium are housed and that is rotated by a rotating mechanism,
a case that has a housing space in which the cell holding body is housed in a rotatable manner,
a cooling heat exchanger for cooling the cell, and
a supply channel that supplies a gas cooled by the cooling heat exchanger to the housing space,
wherein one end of the supply channel is connected to an inside of the housing space and the other end of the supply channel is connected to an outside of the housing space in a radial direction, and
the cooled gas is supplied to the housing space from the one end of the supply channel, and the gas in the housing space circulates through the supply channel.

2. The centrifugal sedimentation particle size distribution measuring device described in claim 1, further comprising
a temperature sensor that detects a temperature of the housing space and
a control part that controls the cooling mechanism based on the temperature detected by the temperature sensor.

3. The centrifugal sedimentation particle size distribution measuring device described in claim 1, further comprising
a light irradiating part that irradiates light to the cell,
a light detecting part that detects the light transmitting the cell, and
a particle size distribution calculating part that obtains a light intensity signal from the light detecting part and calculates the particle size distribution.

4. The centrifugal sedimentation particle size distribution measuring device described in claim 3, further comprising
a temperature sensor that detects a temperature of the housing space and
a control part that controls the cooling mechanism based on the temperature detected by the temperature sensor
wherein the particle size distribution calculating part corrects the particle size distribution based on the temperature detected by the temperature sensor.

5. The centrifugal sedimentation particle size distribution measuring device described in claim 3, wherein
the light irradiating part and the light detecting part are arranged outside of the housing space.

6. The centrifugal sedimentation particle size distribution measuring device described in claim 1, wherein
a rotation axis of the cell holding body extends in the vertical direction, and
the upper and lower surfaces, facing the cell holding body, of the surfaces forming the housing space are flat.

7. The centrifugal sedimentation particle size distribution measuring device described in claim 1, wherein
the cooling heat exchanger, the supply channel, and the housing space form a closed loop through which the gas in the housing space circulates.

8. The centrifugal sedimentation particle size distribution measuring device described in claim 1, wherein
the one end of the supply channel is connected to the housing space through an upper wall of the housing space.

* * * * *